Feb. 5, 1952

L. R. J. JOHNSON 2,584,882

INTEGRATING CIRCUIT

Filed June 5, 1946

INVENTOR
LEONARD R. J. JOHNSON
BY W. S. Grover.
ATTORNEY

Patented Feb. 5, 1952 2,584,882

UNITED STATES PATENT OFFICE 2,584,882

INTEGRATING CIRCUITS

Leonard Reginald Joffre Johnson, Middlesex, England, assignor to Electric & Musical Industries Limited, Hayes, Middlesex, England, a company of Great Britain Application June 5, 1946, Serial No. 674,447

Section 1, Public Law 690, August 8, 1946
Patent expires December 20, 1964

8 Claims. (Cl. 250—27)

Figures 1, 2, 3:
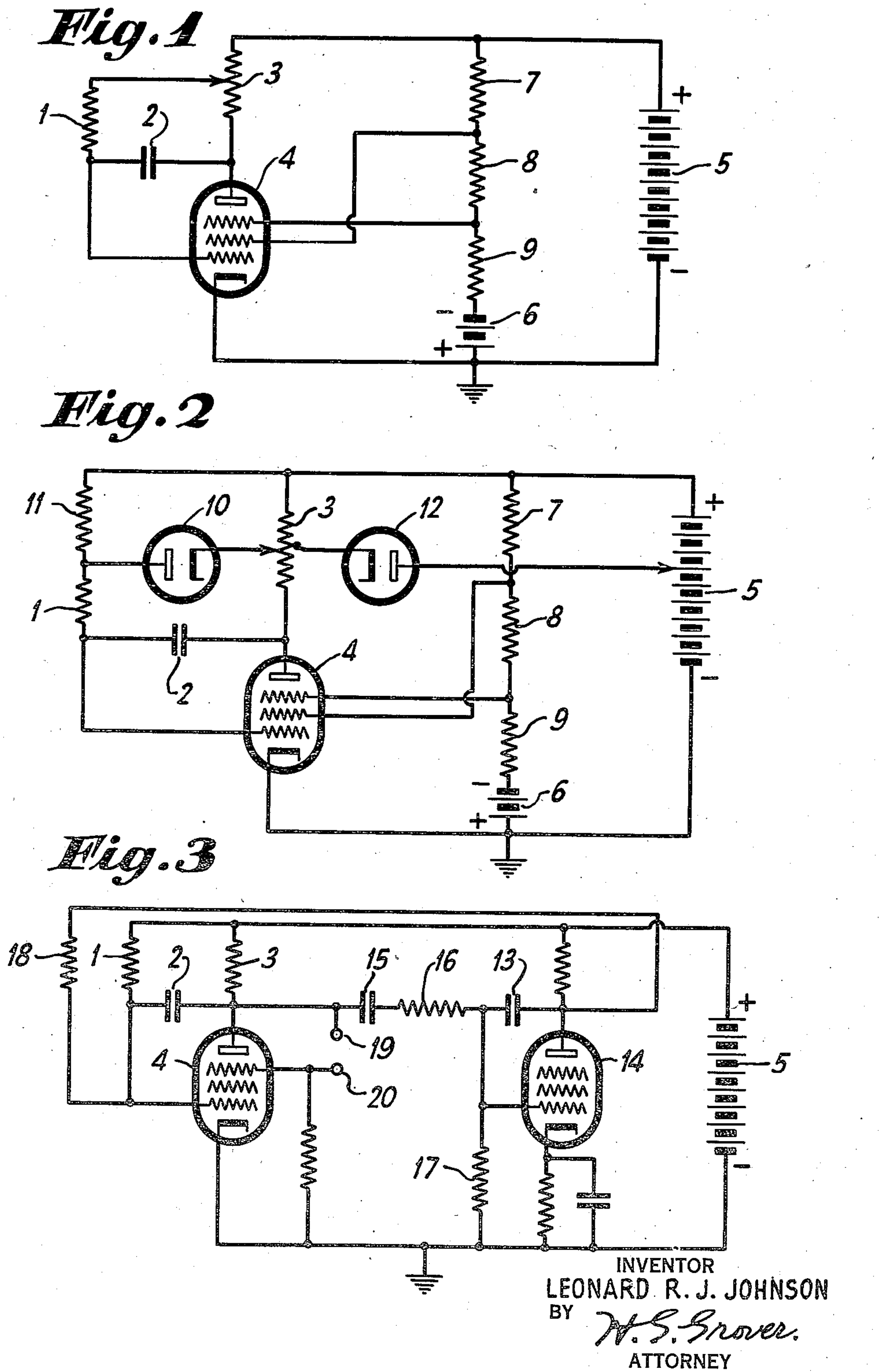

This invention relates to electrical circuit arrangements for effecting integration.

In a copending United States patent application of Alan D. Blumlein, Serial No. 592,641, filed May 8, 1945, there is disclosed an integrating circuit comprising a source of voltage to be integrated, an impedance and a capacity effectively connected in series across the source of voltage and a further impedance effectively connected in series with the first-mentioned impedance, there being provided a thermionic valve amplifier the input and output circuits of which are respectively associated with said impedances so as to provide negative feedback between the input and output circuits via said capacity so that a voltage accurately representing the time integral of the voltage to be integrated is developed in said output circuit. The circuit described in the said Blumlein application causes a voltage to be set up in the output circuit which varies linearly with time and one application of the invention referred to in said Blumlein application is the generation of linear sawtooth waveforms.

Although the generation of a voltage which varies linearly with time is desirable in some cases, nevertheless in other cases it may be required to provide an integrating circuit in which a non-linear variation is introduced. The object therefore of the present invention is to provide an improved integrating circuit in which such a non-linear variation can readily be obtained and controlled to a desired extent.

According to one feature of the present invention there is provided an integrating circuit wherein means are provided for applying also to said integrating circuit electrical energy derived from said integrating circuit so as to modify the integrated output of said circuit.

According to a further feature of the invention there is provided an integrating circuit comprising a thermionic valve amplifier the input and output circuits of which are associated with an impedance and a capacity so as to provide negative feedback between the input and output circuits via said capacity and wherein means are also provided for applying to said integrating circuit electrical energy derived from said integrating circuit so as to modify the integrated output of said circuit.

According to another feature of the present invention there is provided an integrating circuit comprising an impedance and capacity effectively connected in series across a source of voltage or current to be integrated and having a further impedance effectively connected in series with said first-mentioned impedance and said source and a thermionic valve amplifier having its input and output circuits so arranged as to provide negative feedback between said output and input circuits via said capacity and wherein, in order to introduce a non-linear variation into the integrated voltage or current a part or whole of the voltage set up across said further impedance is fed back to said capacity.

The first-mentioned impedance may therefore be connected to a variable tapping point on said further impedance and according to the position of said tapping point so a desired amount of non-linearity can be introduced. If desired, the waveform of the integrated voltage or current can be caused to be linear at its commencement and termination and of an intermediate non-linear form by the provision of unilaterally-conducting devices which are arranged so as to effectively connect or disconnect the tapping on said further impedance.

The invention is of particular use in the generation of sawtooth waveforms.

In generating sawtooth waveforms it may be necessary in some cases to generate a sawtooth waveform having a symmetrical cubic distortion which may be desired for obtaining a truly linear scan (in a television tube, for example) on a plane surface from uniform field-deflecting coils which tend to afford a linear angular scan. Furthermore, sawtooth waveforms may be required which are not truly linear, such as may be necessary in order to correct for optical abberation when employing curved mosaic screens such as are used in some types of television transmitting tubes. In order to generate such waveforms there is applied to the voltage to be integrated a voltage derived from the integrated voltage which is a function of said voltage. For example, in order to introduce a cubic term in the waveform, the integrated voltage may be further integrated and mixed in a suitable proportion with the constant voltage applied to the integrating circuit.

In order that the said invention may be clearly understood and readily carried into effect, it will now be more fully described with reference to the accompanying drawings, in which:

Figure 1 illustrates the invention as applied to a generator of sawtooth voltage waveforms, Figure 2 illustrates a modification of the circuit shown in Figure 1, and Figure 3 illustrates a further form of the invention in which the integrated voltage is further integrated.

Referring first to Figure 1 of the drawings, the circuit shown comprises a resistance 1, a capacity 2 and resistance 3, connected as shown, the common point of the resistance 1 and the capacity 2 being connected to the control electrode of a pentode valve 4 the anode of which is connected to the common point of the capacity 2 and the resistance 3. The anode of the valve 4 is connected through resistance 3 to the positive terminal of a source of constant voltage 5 which is to be integrated, whilst the cathode of the valve 4 is connected to the negative terminal of the source 5. The voltages for the screening electrode and suppressor electrode of the valve 4 are supplied from a potentiometer connected between a point of suitable voltage in the source 5 and the negative pole of the source of bias voltage 6 which has its positive pole connected with the negative pole of the source 5. The potentiometer consists of resistances 7, 8 and 9 connected in series, the screening electrode of valve 4 being connected to the common point of resistances 7 and 8 whilst the suppressor electrode of valve 4 is connected to the common point of resistances 8 and 9, the coupling between the screening and suppressor electrodes being such that the circuit generates in known manner self-maintained sawtooth oscillations.

The circuit described functions in the manner referred to in the above referred to Blumlein application to generate a voltage at the anode of valve 4 of sawtooth waveform.

The mode of operation of such circuit arrangement may be described as follows. On the application of the voltage to be integrated, current flows into the integrating circuit to charge the condenser 2 and, in the absence of the valve 4, assuming that the voltage to be integrated is a constant voltage, the voltage across condenser 2 would rise towards the value of the applied voltage, and as soon as the voltage set up across said condenser exceeded a value small compared with the applied voltage, the charging current would cease to be directly proportional to the applied voltage and the integration would cease to be accurate. Due to the presence of the valve 4, however, any tendency of the charging current to decrease due to the voltage developed in the condenser 2 is resisted by negative feedback via condenser 2, since any decrease in the charging current will reduce the voltage drop in resistance 1 and will make the grid of valve 4 more positive, thus increasing the anode current of said valve and thereby increasing the voltage drop in resistance 3, which effectively increases the charging voltage across condenser 2. Thus, the decrease in charging current which would otherwise follow from the votage developed in the condenser 2 is opposed, and the charging circuit behaves as though it has a very long time constant.

It can be shown that the voltage developed between the anode and cathode of the valve 4 will be substantially proportional to the time integral of the applied voltage provided that the angular frequencies of the Fourier components of the applied voltage satisfy the inequality $$G>>\frac{1}{\omega CR}>>\frac{1}{gR}$$

where G is the gain of the valve 4 in the absence of capacity 2, $g$ is the mutual conductance of the valve 4, R is the value of resistance 1 and C is the value of capacity 2. As in practice the product $GR_g$ may usually be as large as $10^6$, accurate integration can be effected over a wide range of frequency with good amplification so that it is possible to generate integrated voltages of amplitude substantially greater than the amplitude of the applied voltage without appreciable error in integration.

It will be appreciated that the circuit arrangement which has just been described is suitable for the integration of voltages of any waveform, the Fourier components of which satisfy the above inequality. If desired, it may be employed to integrate a constant voltage, in which case the integrated voltage will either increase or decrease in value at a uniform rate for time periods small compared with $2\pi GCR$.

As the voltage of the anode of valve 4 continues to fall it will eventually bring valve 4 to an operating point on the knee of the anode voltage/anode current characteristic of this valve, when the anode current will tend to decrease due to loss of current to the screen grid. The rate of fall of anode voltage is thus reduced, the grid voltage then becomes more positive and more current passes to the screen grid, so causing the screen grid to fall due to the voltage drop caused by the flow of the increased screening grid current through resistance 7. This drop in the screen grid voltage then causes the voltage on the suppressor grid to fall, which further diminishes the anode current and increases the screen grid current due to the fact that the suppressor grid is driven to a voltage which is negative with respect to the cathode of valve 4. Thus, the suppressor grid is rapidly lowered to a voltage so negative that the anode current of valve 4 is completely cut off. The voltage on the anode of valve 4 then rises rapidly and this rise of voltage holds the grid of valve 4 very positive, thus maintaining a high screen grid current and holding the suppressor grid very negative. As the voltage of the anode rises towards the voltage of the source 5, the rate of rise diminishes and the grid voltage falls, when the current to the screening grid begins to decrease and the voltages on the screening grid and suppressor rise and permit the flow of current to the anode to commence and the valve 4 quickly assumes full conductivity. The drop in anode voltage caused by the anode current is communicated to the control grid which is driven sufficiently negative to stop the flow of grid current, and the integration stroke recommences.

According to the present invention the resistance 1 is connected to a tapping point on the resistance 3 so that a part or whole of the voltage developed across the resistance 3 is fed back in negative sense to the capacity 2. By feeding back a part or whole of the voltage generated across the resistance 3 a desired degree of nonlinearity can be introduced into the integrated voltage. The long flank of the sawtooth waveform so generated is partly exponential in form and corresponds to a part of a condenser-resistance decay curve. The position of the tapping point on the resistance 3 determines the amount of exponential curvature introduced, the long flank of the sawtooth being of a substantially complete exponential form when the tapping point is connected to the anode of the valve 4 and of partially exponential form when the tapping point is intermediate the ends of the resistance 3.

If it is desired to cause the long flank of the generated waveform to be linear at its commencement and termination and of an intermediate exponential form, then the circuit shown in Figure 2 of the drawings can be employed. In this figure a diode 10 is provided connected between the resistance 1 and the tapping point on the resistance 3, the upper end of the resistance 1 being connected to the positive terminal of the source of supply 5 through a resistance 11, and a further diode 12 is provided connected between the tapping point on the resistance 3 and a point of suitable positive potential. The diodes 10 and 12 are so arranged and the potentials of their electrodes are suitably chosen so that during the generation of the long flank of the sawtooth waveform the diode 10 is initially non-conducting so that no integrated feedback occurs initially from the resistance 3 and hence the commencement of the long flank is linear and thereafter the diode 10 is rendered conducting due to the changing voltages on its electrodes so that integrating feedback is introduced and the long flank thus becomes exponential until the diode 12 commences to conduct when the long flank will again be rendered linear, since integrating feedback is then eliminated. It is desirable, with the circuit shown in Figure 2, to arrange that the voltage supply connected to the anode of the diode 12 has a regulation impedance low compared with the portion of the resistance 3 between the tapping point and the anode of the valve 4.

Although the invention has been described in connection with Figures 1 and 2 as applied to a generator of sawtooth waveforms in which the generated waveform is self-maintained by virtue of the coupling of the screening and suppressor electrodes of valve 4, the invention is of course not limited to such generators since the invention is equally applicable to generators in which the valve 4 is controlled by an external source of pulses, such as a source of pulses which serves to drive the suppressor electrode of the valve 4 negative to initiate the short flank of the sawtooth waveform. Furthermore, the invention is not limited in its application to the generation of sawtooth waveforms by integrating a fixed applied potential since it can be applied generally to integrating circuits where a controllable amount of non-linearity is required either in a voltage or current waveform.

Figure 3 of the drawings illustrates the invention as applied to a circuit for introducing a cubic term in a sawtooth waveform such as may be required for the purposes hereinbefore referred to. In Figure 3 a constant source of voltage 5 is integrated via resistance 1, condenser 2 and valve 4 similar to the arrangement described in the co-pending Blumlein application, Serial No. 592,641, and the integrated voltage set up is further integrated in a further integrating circuit comprising a condenser 13 which is connected between the anode of a further valve 14 and the control electrode of said valve, as shown, said integrated voltage being fed to said valve 14 and condenser via a coupling condenser 15 and resistance 16, a grid leak resistance 17 being provided, as shown. The further integrated voltage is fed via a resistance 18 to the control electrode of the valve 4 so that it is mixed with the constant voltage to be integrated from the source 5. The final output voltage appearing at the terminal 19 will be a portion of a sine wave, but since the expansion of sine $\theta$ is $$\theta-\frac{\theta^3}{\underline{/3}}+\frac{\theta^5}{\underline{/5}}\ldots \text{etc.}$$

the distortion from a linear sawtooth is substantially proportional to $\theta^3$ provided $\theta$ is less than about 0.5.

In the circuit shown in Figure 3 the valve 4 is not arranged to be a generator of self-maintained sawtooth oscillations but is arranged to be rendered periodically non-conducting to generate the short flanks of the sawtooth oscillations by the application of suitable pulses to the suppressor electrode of the valve 4 from the terminal 20.

In some cases it may be desirable in order to modify the integrated waveform to differentiate the integrated output from the valve 4 instead of integrating said output as with the circuit shown in Figure 3. Also, instead of feeding the output from the valve 14 in parallel with the resistance 1 it may be fed in series therewith.

Having now particularly described and ascertained the nature of my said invention and in what manner the same is to be performed, I declare that what I claim is:

1. A circuit arrangement for integrating a voltage which comprises a source of voltage, a thermionic valve having anode-cathode impedance, an integrating circuit including a first impedance unit and a second impedance unit of a different kind of impedance, said source of voltage, said anode-cathode impedance and said two impedance units all being connected in series with each other, said valve having an input circuit and an output circuit, said first impedance unit being connected to apply voltage from said source through the first impedance unit to said input circuit, said second impedance unit being connected from said output circuit to said input circuit whereby it provides a negative feed-back path between said output circuit and said input circuit, whereby a voltage representing the time integral of the voltage of said source is developed in said output circuit, means responsive to current flow in said thermionic valve for generating a correcting voltage, and means for applying said correcting voltage to said integrating circuit so as to modify the integrated output of said circuit.

2. A circuit arrangement according to claim 1, wherein the last-mentioned means comprises a further impedance common to said series circuit and said output circuit.

3. A circuit arrangement according to claim 1, and means for further integrating the integrated output, said means comprising a second thermionic valve having its input circuit connected to said output circuit of the first valve and having its output circuit connected to said input circuit of the first valve.

4. A circuit arrangement for integrating a voltage which comprises a source of voltage, a thermionic valve having anode-cathode impedance, an integrating circuit including a resistor and a capacitor, said source of voltage, said anode-cathode impedance and said resistor and capacitor all being connected in series with each other, said valve having an input circuit and an output circuit, said resistor being connected to apply voltage from said source through said resistor to said input circuit, said capacitor being connected from said output circuit to said input circuit whereby it provides a negative feed-back path between said output circuit and said input circuit, whereby a voltage representing the time integral of the voltage of said source is developed in said output circuit, means responsive to current flow in said thermionic valve for generating correcting voltage, and means for applying said correcting voltage to said integrating circuit so as to modify the integrated output of said circuit.

5. A circuit arrangement according to claim 4, wherein the last-mentioned means comprise a further resistance common to said series circuit and said output circuit.

6. An integrating circuit comprising an impedance, a capacity and a thermionic valve connected in series across a source of voltage to be integrated, a further impedance connected in series with said first-mentioned impedance and said source, an impedance connected from said further impedance to the anode of said thermionic valve, said thermionic valve having input and output circuits arranged to provide negative feedback therebetween via said capacity.

7. An integrating circuit according to claim 6 wherein there is additionally provided a unilaterally conducting device connected between said impedances and said output circuit and wherein there is provided means for adjusting the conduction threshold on said unilaterally conductive device whereby to conductively and unilaterally by-pass at least a portion of said impedances upon the obtaining of predetermined voltage magnitudes across said unilaterally conductive device.

8. An integrating circuit for integrating an electrical wave, said circuit comprising a thermionic valve having a first control electrode, a second control electrode and an output electrode, and having a screen electrode that separates said control electrodes, a resistor connected to said first control electrode for applying said wave through said resistor to said first control electrode, an impedance connected to said output electrode for applying an operating potential to said output electrode, an impedance element connected to said screen electrode and through which a positive bias voltage is applied thereto, a capacitor connected between said first control electrode and said output electrode whereby said capacitor and said first resistor function to integrate said applied wave, and whereby said capacitor provides negative feed-back to improve the integration, and coupling means between said screen electrode impedance element and said second control electrode whereby changes in voltage of said screen electrode are communicated to said second control electrode so that when said output electrode falls to a predetermined low voltage the current to said screen electrode increases and biasses said second control electrode negatively so as to cause said valve to become non-conducting.

LEONARD REGINALD JOFFRE JOHNSON.

REFERENCES CITED

The following references are of record in the file of this patent:

UNITED STATES PATENTS

| Number | Name | Date |
|---|---|---|
| 2,279,007 | Mortley | Apr. 7, 1942 |
| 2,412,485 | Whitely | Dec. 10, 1946 |